(12) United States Patent
Yasukawa et al.

(10) Patent No.: US 10,512,049 B2
(45) Date of Patent: Dec. 17, 2019

(54) RADIO COMMUNICATION SYSTEM, RADIO COMMUNICATION METHOD, RADIO BASE STATION AND USER TERMINAL

(71) Applicant: NTT DOCOMO, INC., Tokyo (JP)

(72) Inventors: Shimpei Yasukawa, Tokyo (JP); Satoshi Nagata, Tokyo (JP); Yoshihisa Kishiyama, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/661,244

(22) Filed: Jul. 27, 2017

(65) Prior Publication Data
US 2017/0339652 A1    Nov. 23, 2017

Related U.S. Application Data

(63) Continuation of application No. 14/762,546, filed as application No. PCT/JP2013/084277 on Dec. 20, 2013.

(30) Foreign Application Priority Data

Jan. 24, 2013   (JP) ................................. 2013-011456

(51) Int. Cl.
  *H04W 56/00*       (2009.01)
  *H04W 74/08*       (2009.01)
(52) U.S. Cl.
  CPC ......... *H04W 56/001* (2013.01); *H04W 56/00* (2013.01); *H04W 56/0055* (2013.01); *H04W 74/0891* (2013.01)
(58) Field of Classification Search
  CPC ........... H04W 56/001; H04W 56/0055; H04W 56/0045; H04W 56/0015; H04W 56/0005; H04W 56/00; H04W 74/0891
  See application file for complete search history.

(56) References Cited

U.S. PATENT DOCUMENTS 6,208,871 B1   3/2001  Hall et al.
8,971,265 B2   3/2015  Yoshimoto et al.
(Continued)

FOREIGN PATENT DOCUMENTS

CN    1383632 A    12/2002
CN    102714851 A  10/2012
(Continued)

OTHER PUBLICATIONS

Office Action issued in the counterpart Japanese Patent Application No. 2013-011456, dated Jun. 27, 2017 (16 pages).
(Continued)

*Primary Examiner* — Jamal Javaid
(74) *Attorney, Agent, or Firm* — Osha Liang LLP

(57) ABSTRACT

The present invention is designed to establish synchronization between transmission points when downlink signals are transmitted from a plurality of transmission points to a user terminal. A radio communication system has a first radio base station that forms a first cell, a second radio base station that forms a second cell, which is placed on the area of the first cell in an overlapping manner, and a user terminal that is capable of carrying out radio communication with the first radio base station and the second radio base station, and the second radio base station has a receiving section that receives synchronization correction information, which is for establishing synchronization with a synchronization target, from the user terminal, and a synchronization correction section that corrects synchronization based on the synchronization correction information.

8 Claims, 12 Drawing Sheets

(56) References Cited

U.S. PATENT DOCUMENTS

| | | | |
|---|---|---|---|
| 2007/0274278 A1 | 11/2007 | Choi et al. | |
| 2010/0296491 A1 | 11/2010 | Wang et al. | |
| 2011/0249665 A1 | 10/2011 | Seyama et al. | |
| 2011/0281571 A1* | 11/2011 | Patel ................ | H04W 56/0015 455/418 |

FOREIGN PATENT DOCUMENTS

| | | |
|---|---|---|
| JP | 2002-505542 A | 2/2002 |
| JP | 2010500794 A | 1/2010 |
| JP | 2011-40832 A | 2/2011 |
| JP | 2011147096 A | 7/2011 |
| WO | 2010076854 A1 | 7/2010 |
| WO | 2011/063407 A1 | 5/2011 |
| WO | 2011063047 A1 | 5/2011 |

OTHER PUBLICATIONS

Office Action issued in corresponding Chinese Patent Application No. 201380071153.9, dated Jan. 29, 2018 (21 paages).
Office Action issued in corresponding Chinese Application No. 201380071153.9, dated Aug. 16, 2018 (12 pages).
Office Action issued in corresponding Japanese Application No. 2017-185643, dated Sep. 18, 2018 (9 pages).
International Search Report in corresponding PCT Application No. PCT/JP2013/084277 dated Mar. 18, 2014 (2 pages).
3GPP TR 25.912 V7.1.0; "3rd Generation Partnership Project; Technical Specification Group Radio Access Network; Feasibiity study for evolved Universal Terrestrial Radio Access (UTRA) and Universal Terrestrial Radio Access Network (UTRAN) (Release 7)"; Sep. 2006 (57 pages).
Office Action issued in the counterpart Japanese Patent Application No. 2013-011456, dated Feb. 14, 2017 (12 pages).

* cited by examiner

RADIO COMMUNICATION SYSTEM, RADIO COMMUNICATION METHOD, RADIO BASE STATION AND USER TERMINAL

CROSS-REFERENCE TO RELATED APPLICATIONS

The present application is a continuation application and, thereby, claims benefit under 35 U.S.C. § 120 to U.S. patent application Ser. No. 14/762,546 filed on Jul. 22, 2015, titled, "RADIO COMMUNICATION SYSTEM, RADIO COMMUNICATION METHOD, RADIO BASE STATION AND USER TERMINAL," which is a national stage application of PCT Application No. PCT/JP2013/084277, filed on Dec. 20, 2013, which claims priority to Japanese Patent Application No. 2013-011456 filed on Jan. 24, 2013, the contents of which are incorporated by reference in their entirety.

TECHNICAL FIELD

The present invention relates to a radio communication system, a radio communication method, a radio base station and a user terminal that are applicable to cellular systems and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, LTE (Long-Term Evolution) is under study for the purposes of further increasing high-speed data rates, providing low delay and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study for the purpose of achieving further broadbandization and higher speed (for example, LTE-advanced ("LTE-A")). The system band of an LTE-A system includes at least one component carrier (CC), where the system band of the LTE system is one unit. Achieving broadbandization by gathering a plurality of components carriers (cells) in this way is referred to as "carrier aggregation" (CA).

Now, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is established between user terminals UE (User Equipment) in the frequency domain. Meanwhile, between cells, like in W-CDMA, interference randomization by one-cell frequency re-use is fundamental.

So, in the 3GPP (3rd Generation Partnership Project), coordinated multi-point transmission/reception (CoMP) techniques are under study as techniques to realize inter-cell orthogonalization. In this CoMP transmission/reception, a plurality of cells coordinate and perform the process for transmitting and receiving signals, for one user terminal UE or for a plurality of user terminals UE. For example, on the downlink, simultaneous transmission by multiple cells by employing precoding, coordinated scheduling/beamforming and so on are under study. By employing these CoMP transmission/reception techniques, improvement of throughput performance is expected, especially with respect to user terminals UE located on cell edges.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Up to LTE Rel. 10, a user terminal UE had only to carry out the receiving process on the assumption that downlink signals were transmitted from a single radio base station. However, from Rel. 11 onward, following the introduction of the above-noted CoMP techniques and/or the like, transmission modes to transmit downlink signals from a plurality of transmission points to a user terminal UE have also been assumed.

When downlink signals are transmitted from a plurality of transmission points (radio base stations), cases might occur where, depending on the position relationship between a user terminal UE and each transmission point, and so on, every downlink signal shows different characteristics (received time, frequency offset and so on). In such cases, if the user terminal UE carries out the synchronization process on the assumption that the downlink signals are transmitted from a single radio base station as has been the case heretofore, there is a threat that the time synchronization and frequency synchronization of the downlink signals cannot be established, and the reliability of reception decreases.

Consequently, when downlink signals are transmitted from a plurality of transmission points to a user terminal UE, synchronization needs to be established between the transmission points.

The present invention has been made in view of the above, and it is therefore an object of the present invention to provide a radio communication system, a radio communication method, a radio base station and a user terminal, whereby, when downlink signals are transmitted from a plurality of transmission points to a user terminal, synchronization can be established between the transmission points.

Solution to Problem

The radio communication system according to the present invention is a radio communication system to have a first radio base station that forms a first cell, a second radio base station that forms a second cell, which is placed on an area of the first cell in an overlapping manner, and a user terminal that is capable of carrying out radio communication with the first radio base station and the second radio base station, and, in this radio communication system, the second radio base station has a receiving section that receives synchronization correction information, which is for establishing synchronization with a synchronization target, from the user terminal, and a synchronization correction section that corrects synchronization based on the synchronization correction information.

Advantageous Effects of Invention

According to the present invention, when downlink signals are transmitted from a plurality of transmission points to a user terminal, it is possible to establish synchronization between the transmission points.

DESCRIPTION OF EMBODIMENTS

Now, an embodiment of the present invention will be described below in detail with reference to the accompanying drawings.

Figure 1A:
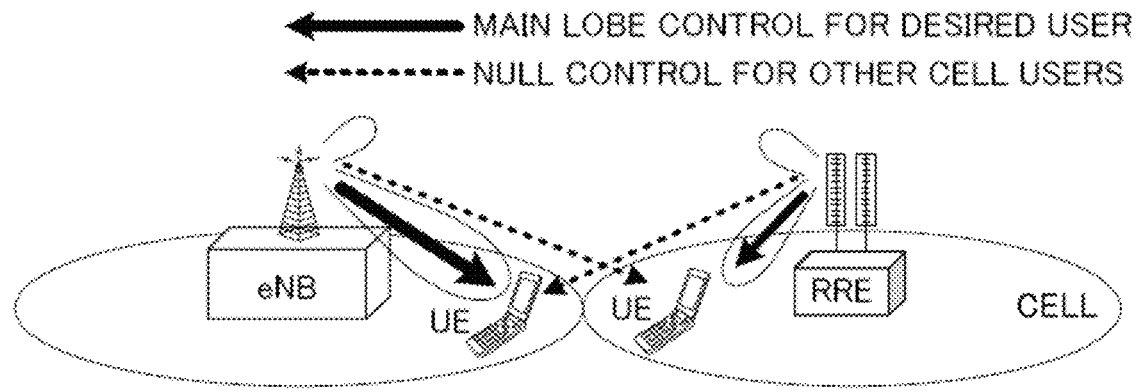
FIG. 1A provides diagrams to explain coordinated multiple-point transmission.

First, coordinated multiple point (CoMP) transmission on the downlink will be described with reference to FIG. 1. Downlink CoMP transmission includes coordinated scheduling/coordinated beamforming (CS/CB), and joint processing. CS/CB refers to a method of transmitting a shared data channel (PDSCH: Physical Downlink Shared Channel) from only one transmission/reception point (or radio base station, cell, etc.) to one user terminal UE, and, as shown in FIG. 1A, allocates radio resources in the frequency/space domain, taking into account interference from other transmission/reception points, interference against other transmission/reception points, and so on.

Figure 1B:
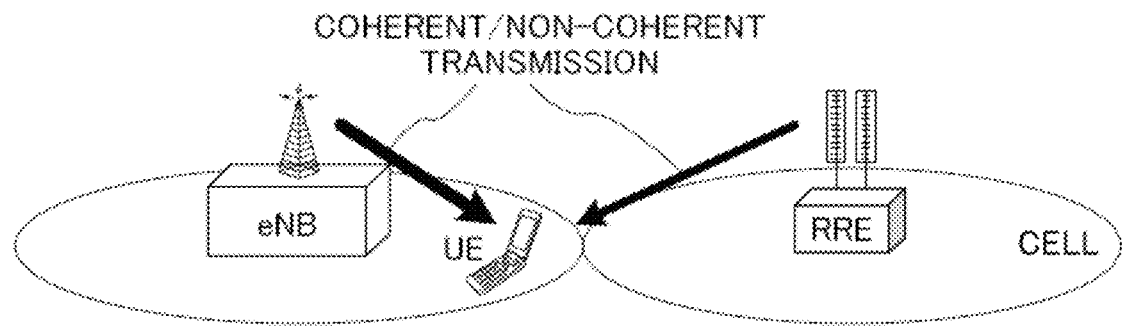
FIG. 1B provides diagrams to explain coordinated multiple-point transmission.
Figure 1C:
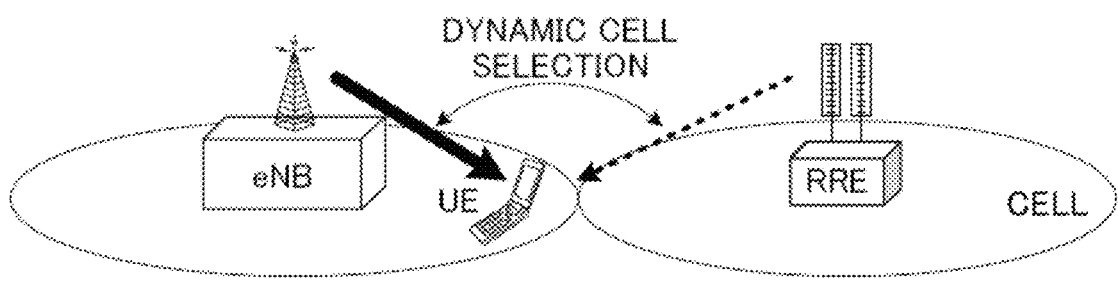
FIG. 1C provides diagrams to explain coordinated multiple-point transmission.

Meanwhile, joint processing refers to a method of transmitting a shared data channel from a plurality of transmission/reception points simultaneously by employing precoding, and includes joint transmission (JT) to transmit a shared data channel from a plurality of transmission/reception points to one user terminal UE as shown in FIG. 1B, and dynamic point selection (DPS) to select one transmission/reception point dynamically and transmit a shared data channel as shown in FIG. 1C. There is also a transmission mode referred to as "dynamic point blanking (DPB)," which stops data transmission in a certain region with respect to a transmission/reception point that causes interference.

CoMP transmission is employed to improve the throughput of user terminals UE located on cell edges. Consequently, CoMP transmission is controlled to be applied when there is a user terminal UE located on a cell edge. In this case, a radio base station apparatus finds differences between the quality information which the user terminal UE generates on a per cell basis (for example, the RSRP (Reference Signal Received Power)), the RSRQ (Reference Signal Received Quality), the SINR (Signal Interference plus Noise Ratio) and so on, and, when such differences equal or fall below a threshold—that is, when there is little difference in quality between the cells—decides that the user terminal UE is located on a cell edge, and applies CoMP transmission.

As for the environment to employ CoMP transmission/reception, there are, for example, a structure to include a plurality of remote radio equipment (RRE) that are connected to a radio base station (radio base station eNB) via optical fiber and/or the like (RRE structure-based centralized control), and a structure of a radio base station (radio base station eNB) (independent base station structure-based autonomous distributed control).

When CoMP transmission/reception is employed, downlink signals (downlink control signals, downlink data signals, synchronization signals, reference signals and so on) are transmitted from a plurality of transmission points or from a specific transmission point, to a user terminal UE. Upon receiving the downlink signals, the user terminal UE performs the receiving process by using, for example, the reference signals (cell-specific reference signals (CRSs), user-specific demodulation reference signals (DM-RSs), channel state measurement reference signals (CSI-RSs) and so on). The receiving process carried out by the user terminal UE includes, for example, signal processing such as channel estimation, a synchronization process, a demodulation process, a feedback information (CSI) generation process and so on.

Figure 2:
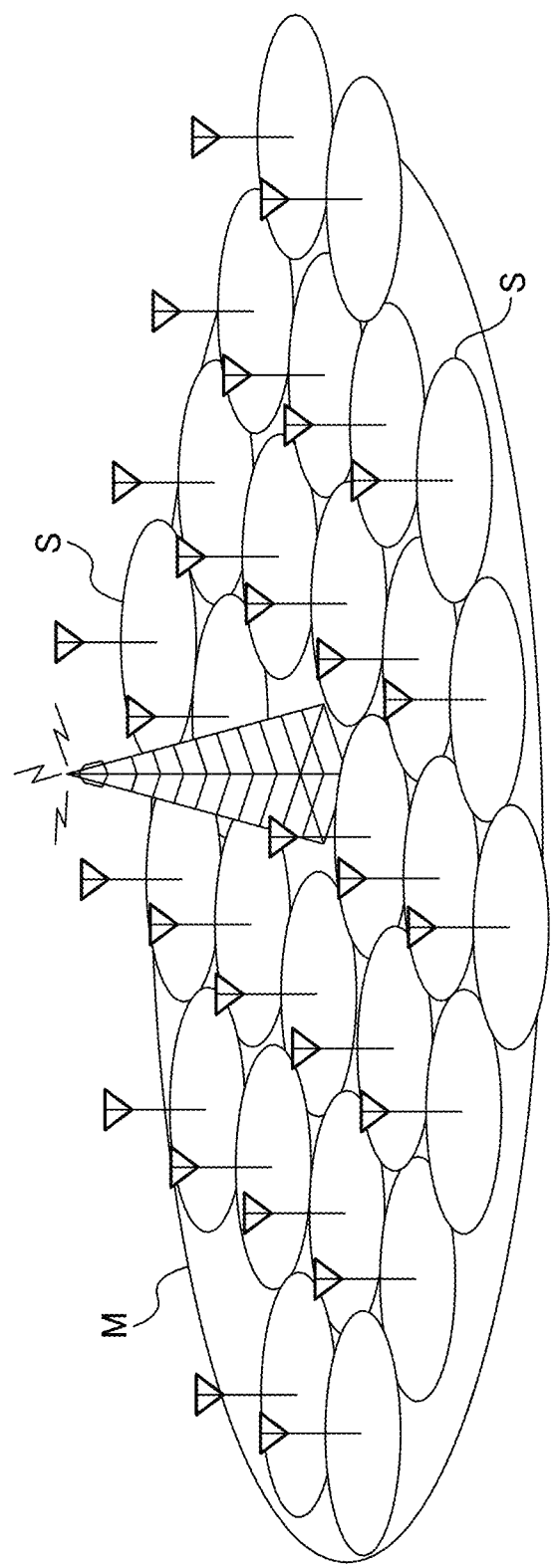
FIG. 2 is a diagram to explain a heterogeneous network structure.

Now, as a radio network structure to employ LTE-A, as shown in FIG. 2, a heterogeneous network structure to arrange many small cells S on the area of a macro cell M is under study. For example, in a heterogeneous network, on the area of a macro cell M using conventional frequencies (for example, 2 GHz and 800 MHz), small cells S to use different frequencies (for example, 3.5 GHz) from those of the macro cell M are overlaid. In LTE Rel. 12, a study is in progress to increase the density of such small cells S even more (SCE: Small Cell Enhancement). For example, a study is in progress to arrange several hundreds of small cells S for a single macro cell M.

As shown in FIG. 2, in a network where small cells S are densely placed on a macro cell M area, there is a possibility that CoMP transmission is conducted between the small cells S with respect to a user terminal UE. In this case, the user terminal UE can achieve high throughput constantly, by using the plurality of small cells S seamlessly.

However, although a plurality of small cells S can be synchronized if the small cells S are controlled in a centralized manner by means of optical configuration, the general premise is that a plurality of small cells S are not synchronized. If small cells S stay unsynchronized, CoMP transmission between the small cells S is difficult. Consequently, to realize CoMP transmission between such small cells S, it is necessary to establish time synchronization and frequency synchronization between these small cells S.

The present inventor has noticed that, in a network structure in which small cells S are placed densely on a macro cell M area, it is possible to establish synchronization between the small cells S, by allowing the small cells S to estimate the desynchronization (out-of-synchronaization) between the small cells S by transmitting and receiving information related to the synchronization that is acquired from radio signals, by using one of the macro cell M, nearby small cells S and user terminals UE, and, furthermore, correct the synchronization in steps or all at once based on information about the estimated desynchronization, and thereupon arrived at the present invention. That is, the present invention is designed to estimate the desynchronization between small cells S by transmitting and receiving information related to synchronization that is acquired from radio signals, by using one of a macro cell M, nearby small cells S or user terminals UE, and correcting the synchronization between the small cells S based on information about the estimated desynchronization.

Generally, the synchronization process includes a "synchronization acquisition process," which is the process of establishing a synchronous state at the beginning of communication, and a "synchronization tracking process," which is the process of continuing monitoring after synchronization is established so that the synchronous state is not lost upon modulation, due to the condition of noise, and so on. "Synchronization" as used herein refers to one or both of "synchronization acquisition" and "synchronization tracking," unless explained otherwise, and the "synchronization process" as used herein refers to one or both of the "synchronization acquisition process" and the "synchronization tracking process."

In the examples shown below, the macro cell M can acquire absolute synchronization (hereinafter also referred to as "GPS synchronization"), by using a GPS clock that is extracted from electromagnetic waves from a GPS (Global Positioning System) satellite. Furthermore, the macro cell M can collect the desynchronization (out-of-synchronaization) information, and report the amount of correction of synchronization to each small cell S.

Part of the small cells S can acquire absolute synchronization by using a GPS clock. Also, part of the small cells S can collect the desynchronization information as a representative, and report the amount of correction of synchronization to each small cell S. Furthermore, the small cells S can assume user terminal UE mode and execute part or all of the functions of the user terminals UE.

Part or all of the user terminals UE can acquire absolute synchronization by using a GPS clock. Also, the user terminals UE may be able to connect with the small cells S, or may be able to connect with the macro cell M. Alternatively, the user terminals UE may be able to connect with both the small cells S and the macro cell M.

First Example

Figure 3A:
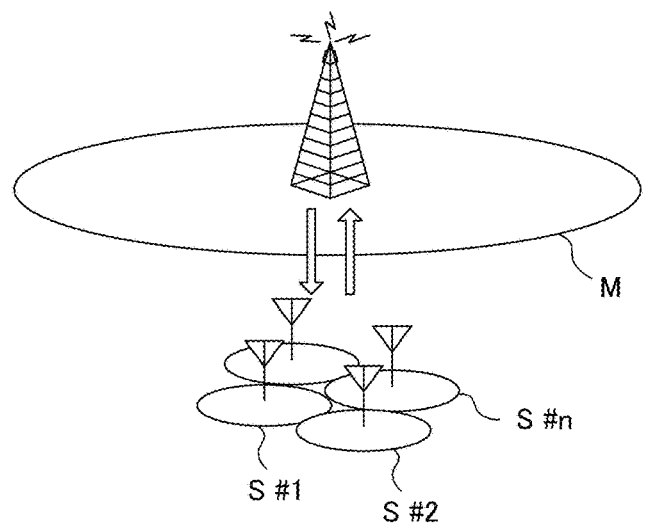
FIG. 3A provides diagrams to show radio communication systems according to the present embodiment.

In a first example, also referred to as "macro-assisted," a macro cell M and a group of small cells S (S #1 to S #n) are provided as shown in FIG. 3A, where the small cells S receive radio signals transmitted from the macro cell M, and establish synchronization between the small cells S based on these signals.

Figure 4:
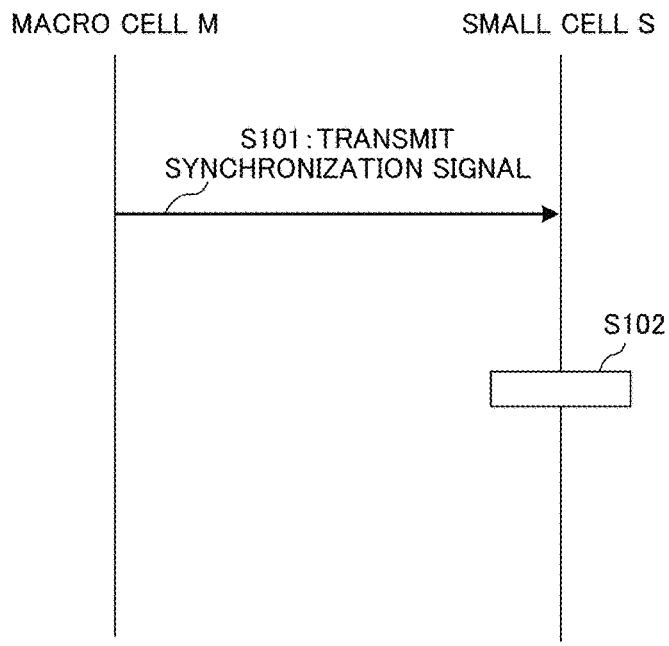
FIG. 4 is an example sequence diagram to show a radio communication method according to the present embodiment.

Now, with reference to FIG. 4, a case will be described below, as a "macro-assisted" example, in which small cells S receive radio signals transmitted from a macro cell M, and establish synchronization between the small cells S based on these signals.

First, the macro cell M transmits synchronization signals, which are radio signals, to the small cells S (step S101). Then, the small cells S correct their synchronization in accordance with the synchronization signals received (step S102). By executing step S102, the small cells S synchronize with the macro cell M. By executing steps S101 and S102 with respect to each small cell S (S #1 to S #n), synchronization is established between the small cells S.

When the small cells S do not know the information that is required to receive the synchronization signals from the macro cell M (for example, the cell ID), the small cells S can send a request for the information to the macro cell M in advance, and acquire a priori information. In this case, for example, a structure may be employed in which the small cells S discover the cell ID of the macro cell M by performing a cell search. By this means, it is possible to receive the synchronization signals without errors.

Alternatively, it is also possible to report a priori information from the macro cell M to the small cells S in advance. In this case, for example, a structure to send the a priori information by using a backhaul link may be employed. By this means, it is possible to receive the synchronization signals without errors.

As for the synchronization signals, it is possible to use conventional signals such as the PSS/SSS (PSS: Primary Synchronization Signal, and SSS: Secondary Synchronization Signal), the CRS, the CSI-RS, the DM-RS, the PRS (Positioning Reference Signals), the SRS (Sounding Reference Signal) and so on, or use signals that are newly defined. The newly defined signals may include, for example, a signal in which a conventional signal is multiplexed in arbitrary subframe intervals, a discovery signal and so on.

The discovery signals refers to a signal that is defined on the downlink in the radio communication scheme for the local areas, and is a detection signal which the user terminals UE use to detect the small cells S. Note that the discovery signal may be referred to as, for example, the "PDCH (Physical Discovery Channel)," the "BS (Beacon Signal)," the "DPS (Discovery Pilot Signal)" and so on.

Note that signals having the following characteristics may be used as the discovery signal. The discovery signal may be formed with one of the signals (a) to (e) shown below, or may be formed by combining the signals (a) to (e) in an arbitrary manner.

(a) The synchronization signals (PSS and SSS) defined in LTE (Rel. 8) may be used.

(b) Signals that use the same sequences as the synchronization signals defined in LTE (Rel. 8), and multiplex these sequences in different locations along the time/frequency direction may be used. For example, signals to multiplex the PSS and the SSS in different slots may be used.

(c) Discovery signals that are defined anew for small cell selection may be used. For example, signals that have characteristics of having a long transmission cycle and having a large amount of radio resources per transmission unit compared to the synchronization signals (PSS and SSS) defined in LTE (Rel. 8) may be used.

(d) Conventional reference signals (the CSI-RS, the CRS, the DM-RS, the PRS and the SRS) that are defined in LTE-A (Rel. 10) may be used. Also, part of the conventional reference signals (for example, a signal to transmit the CRS of one port in a 5-msec cycle) may be used.

(e) Signals that are multiplexed in the same multiplexing locations as conventional reference signals defined in LTE-A (Rel. 10) (the CSI-RS, the CRS, the DM-RS, the PRS and the SRS), and that nevertheless use different signal generating methods for scrambling sequences and so on may be used.

When radio signals from the macro cell M or synchronization information of the macro cell M is used in the correction of synchronization in the small cells S, there is a possibility that desynchronization in time is produced between the small cells S due to the influence of propagation delay. However, in a network structure in which small cells S are densely placed on a macro cell M area as shown in FIG. 2, the propagation delay with respect to the macro cell M gives similar values between neighboring small cells S, so that it is possible to reduce the influence of propagation delay. For example, approximately 0.33 [μs] of propagation delay may be produced over 100 m. When CoMP is conducted between small cells S, the coordinated cells are assumed to neighbor each other, so that the propagation delay has little influence from the perspective of CoMP.

The radio communication system according to the first example may be structured to further have a synchronization management server. The synchronization management server can be accessed from the macro cell M or from the small cells S, and can collect desynchronization information and report the amount of correction of synchronization to each small cell S.

Figure 5:
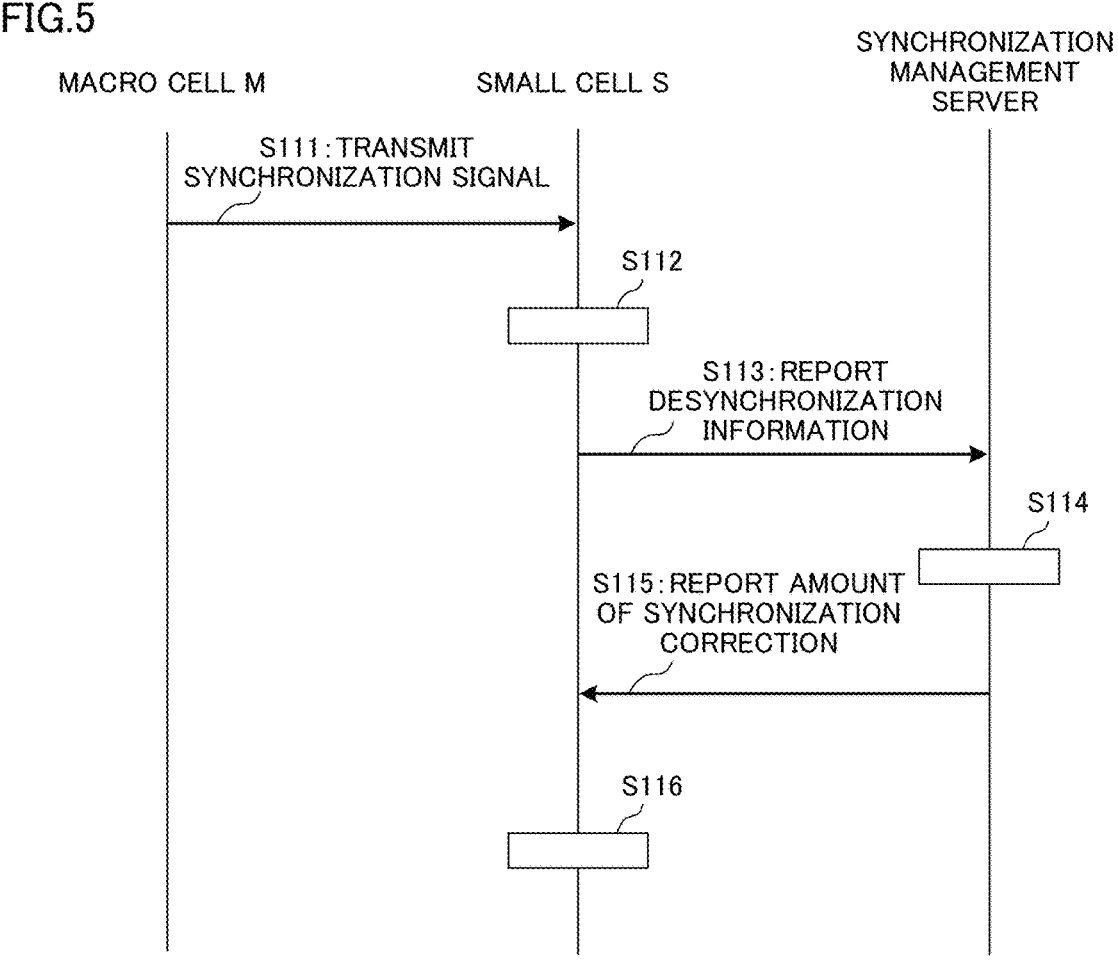
FIG. 5 is an example sequence diagram to show a radio communication method according to the present embodiment.

Now, with reference to FIG. 5, a case will be described below, as a "macro-assisted" example, where a structure to have a synchronization management server is employed, and where small cells S receive radio signals transmitted from a macro cell M and establish synchronization between the small cells S based on these signals.

First, the macro cell M transmits synchronization signals, which are radio signals, to the small cells S (step S111). The small cells S estimate their desynchronization from the synchronization signals that are received (step S112), and report desynchronization information to the synchronization management server by using a wired link (step S113). The synchronization management server determines the amount of correction of synchronization from the desynchronization information that is reported (step S114), and reports the amount of correction of synchronization to the small cells S by using a wired link (step S115). Then, the small cells S correct their synchronization based on the amount of correction of synchronization that is received (step S116). By executing step S116, the small cells S synchronize with the macro cell M.

By providing a synchronization management server, it is possible to collect the desynchronization information in the synchronization management server and manage the state of synchronization.

In this way, with the synchronization method for small cells according to the first example, the small cells S receive radio signals transmitted from the macro cell M, and establish synchronization between the small cells S based on these signals. By this means, it becomes possible to establish time synchronization and frequency synchronization between the small cells S, which is for realizing CoMP transmission between the small cells S with respect to user terminals UE.

Second Example

Figure 3B:
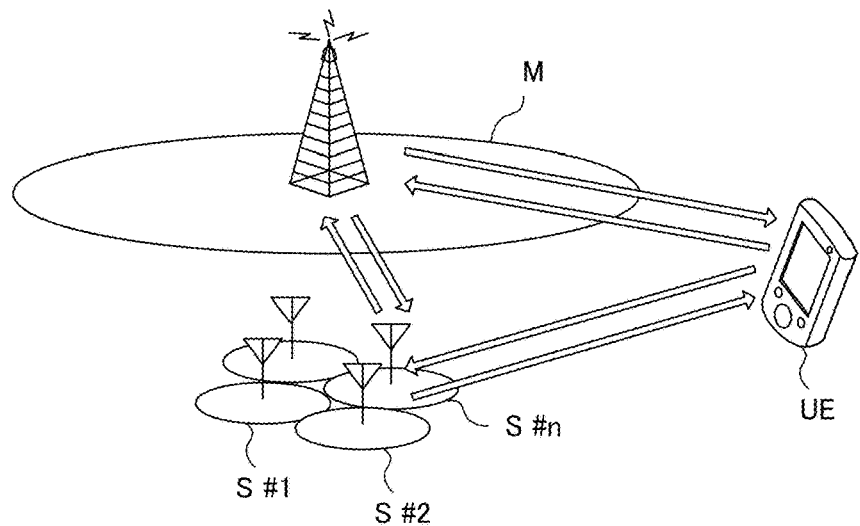
FIG. 3B provides diagrams to show radio communication systems according to the present embodiment.

In a second example, also referred to as "UE-assisted autonomous," a macro cell M, a group of small cells S (S #1 to S #n) and a user terminal UE are provided as shown in FIG. 3B, and the user terminal UE assists the synchronization between the small cells S in an autonomous distributed manner, so that synchronization is established between the small cells S.

Figure 6:
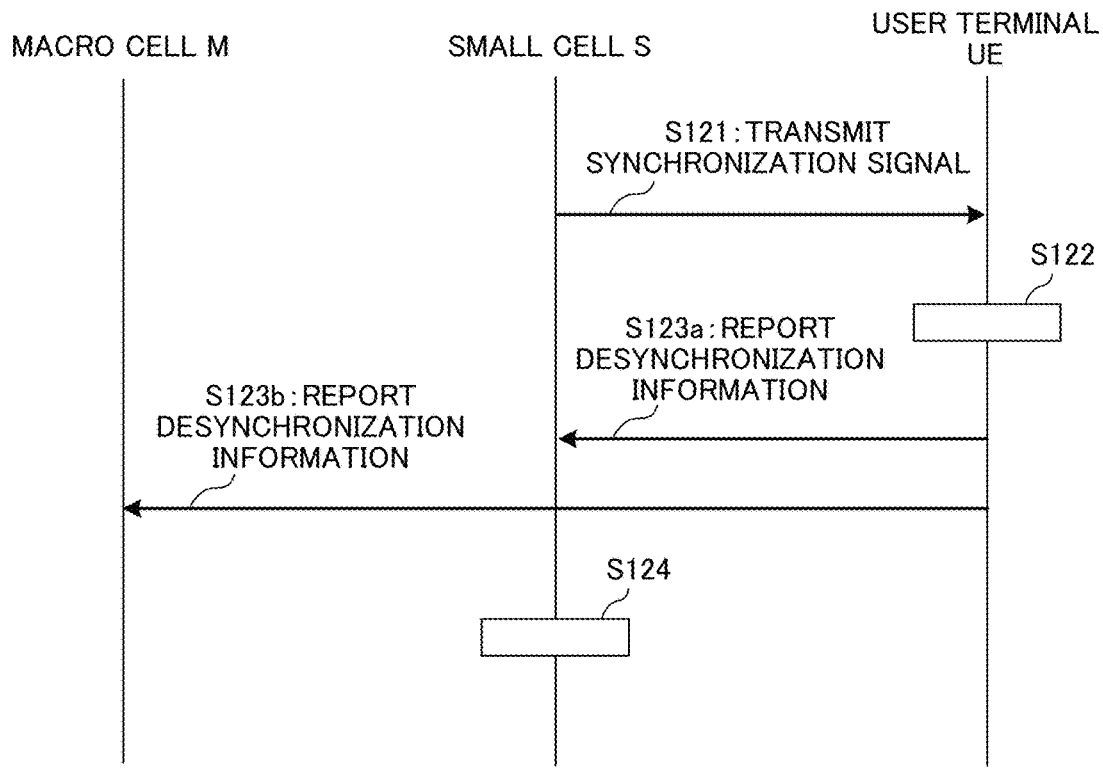
FIG. 6 is an example sequence diagram to show a radio communication method according to the present embodiment.

Now, with reference to FIG. 6, a case will be described below, as a "UE-assisted autonomous" example, where the user terminal UE reports desynchronization (out-of-synchronaization) by using the synchronization signals from the small cells S.

First, the small cells S transmit synchronization signals to the user terminal UE (step S121). As for the synchronization signals, the same synchronization signals as those used in the first example can be used.

Note that, before executing step S121, it is also possible to transmit a signal to designate the target cells to estimate the desynchronization in step S122, from the macro cell M or the small cells S to the user terminal UE, by using higher layer signaling and so on. By this means, it is possible to designate the target cells to estimate the desynchronization.

Also, in step S121, it is also possible to transmit information as to whether or not GPS synchronization is established between the small cells S, from the macro cell M or the small cells S to the user terminal UE, by using higher layer signaling and so on. By this means, it becomes possible to report information about the small cells S where absolute synchronization is established, to the user terminal UE.

Following this, the user terminal UE, having received the synchronization signals, estimates the deviation (desynchronization) in time and frequency with respect to nearby small cells S (step S122). The target cells to estimate the deviation in time and frequency may be all the small cells S from which the user terminal UE can receive the synchronization signals, or may be small cells S (group) that are designated in advance. Furthermore, cells that rank high in the received quality of the synchronization signals may be arbitrarily selected on the user terminal UE side as target cells.

Following this, the user terminal UE reports desynchronization information to the connecting small cell S or the macro cell M (step S123a and S123b). The small cell S having received the desynchronization information from the user terminal UE can transfer part or all of this received desynchronization information to other small cells S that have the cell ID contained in the desynchronization information. Also, it is equally possible that the macro cell M having received the desynchronization information from the user terminal UE determine the amount of correction of synchronization from this reported desynchronization information, and transmit the amount of correction of synchronization to each small cell S.

Then, the small cells S having received the desynchronization information or the amount of correction of synchronization correct their synchronization based on this information (step S124). By executing above steps S122 and S123a (S123b) in each user terminal UE, synchronization is established between the small cells S.

Note that the radio communication system according to the second example may be structured to further have a synchronization management server. In this case, in steps S123a and S123b, the user terminal UE may report the desynchronization information to the synchronization management server. Then, the synchronization management server, having received the report, may be structured to determine the amount of correction of synchronization from the desynchronization information reported, and transmit the amount of correction of synchronization to each small cell S.

Figure 7:
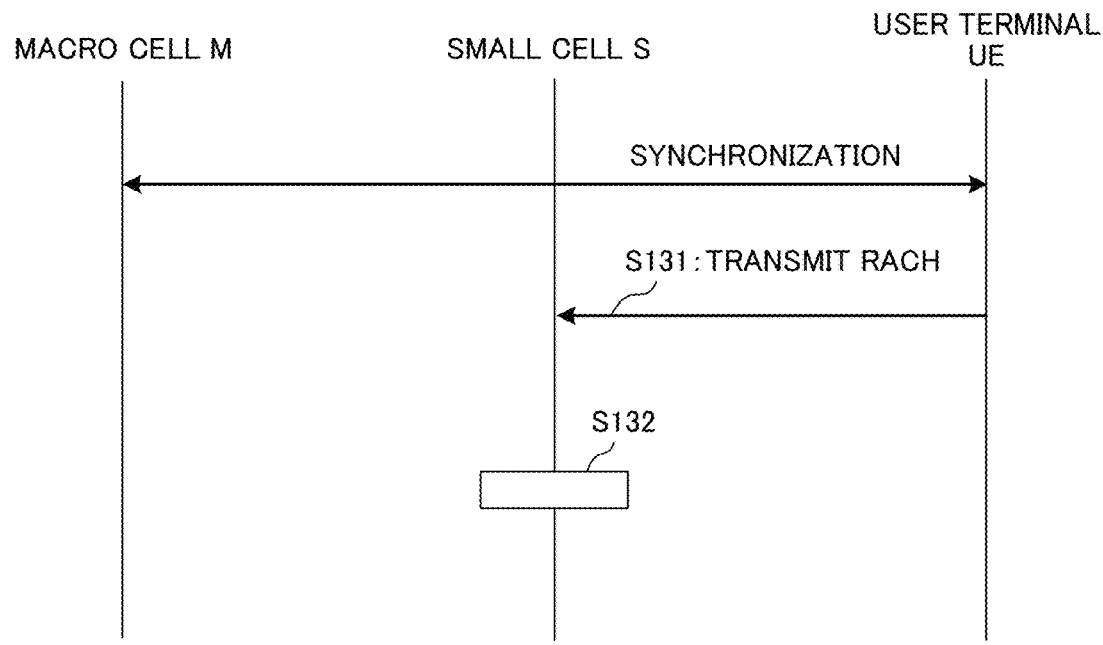
FIG. 7 is an example sequence diagram to show a radio communication method according to the present embodiment.

Now, with reference to FIG. 7, a case will be described below as a "UE-assisted autonomous" example, where user terminals UE transmit RACH (Random Access Channel) signals to the small cells S, and the small cells S correct the desynchronization based on this RACH information.

First, user terminals UE that are synchronized with the macro cell M transmit RACH signals to the small cells S based on the time of the macro cell M (step S131). Alternatively, user terminals UE that are GPS-synchronized transmit the RACH signals based on the GPS clock (step S131).

Note that, in order to prevent the RACHs from colliding, it is possible to report the preamble indices to use for the RACHs from the macro cell M or the small cells S to the user terminals UE. Alternatively, the user terminals UE may select the preamble indices in advance.

Also, when the user terminals UE are GPS-synchronized, it is equally possible to send a report to the small cells S to the effect that GPS synchronization is established.

Then, the small cells S correct their desynchronization based on the RACH information received (step S132). The small cells S can estimate the average desynchronization by using, for example, RACH information that is transmitted from a plurality of user terminals UE. Alternatively, the small cells S can locate user terminals UE that are present near the small cells S based on the times the RACHs are received, the received quality of the RACHs, and so on, and estimate the desynchronization based on the RACH information from these user terminals UE. By executing above step S132 in each small cell S, synchronization is established between the small cells S.

Figure 8:
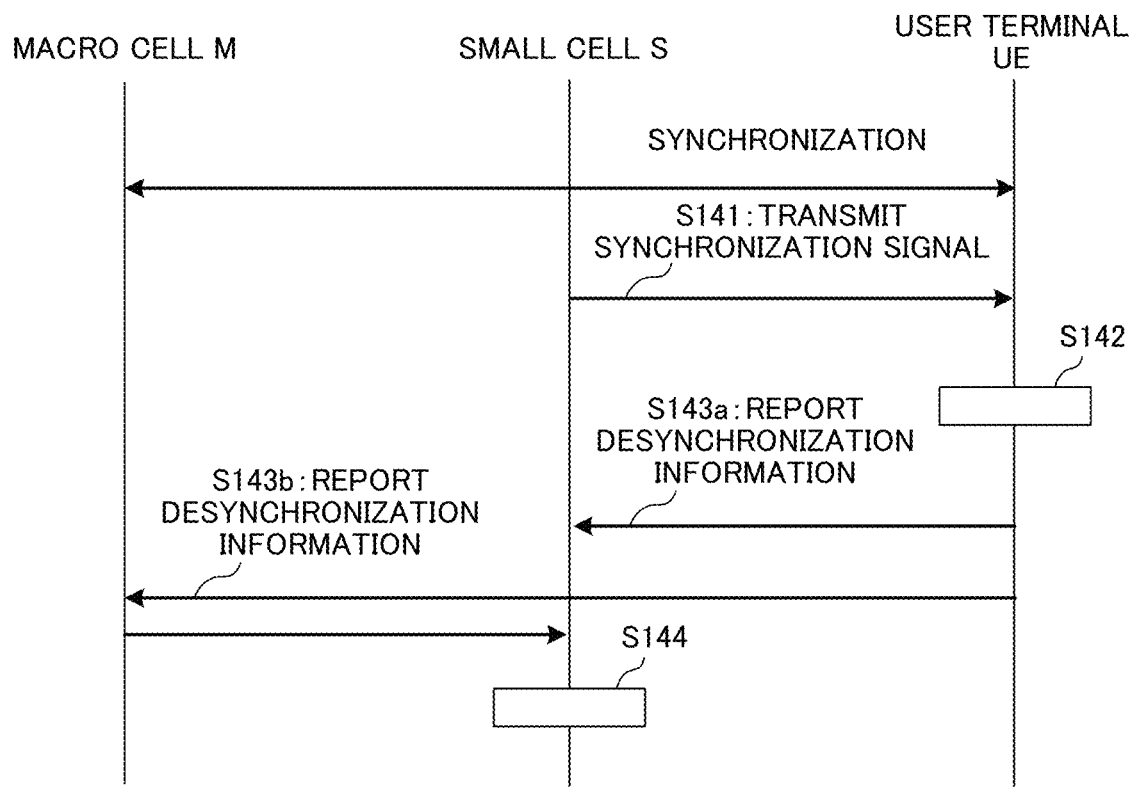
FIG. 8 is an example sequence diagram to show a radio communication method according to the present embodiment.

Now, with reference to FIG. 8, a case will be described below, as a "UE-assisted autonomous" example, where user terminals UE that are synchronized with the macro cell M or that are GPS-synchronized report desynchronization (out-of-synchronaization) by using the synchronization signals from the small cells S.

First, the small cells S transmit synchronization signals to the user terminals UE (step S141).

Following this, user terminals UE that are synchronized with the macro cell M estimate the desynchronization between the macro cell M and the small cells S by using the synchronization signals received (step S142). Alternatively, user terminals UE that are GPS-synchronized estimate the desynchronization between the macro cell M and the small cells S by using the synchronization signals received (step S142).

The user terminals UE to estimate the desynchronization may be all the user terminals UE that can receive the synchronization signals, or may be user terminals UE (group) that are designated in advance. Alternatively, it is equally possible to arbitrarily select user terminals UE that rank high in the received quality of the synchronization signals on the small cell S side as user terminals UE to estimate the desynchronization, and send notice to these user terminals UE. Note that the small cells S can estimate the received quality in the user terminals UE by using uplink reference signals from the user terminals UE. Also, it is equally possible that the user terminals UE report the received quality in the user terminals UE to the small cells S.

Following this, the user terminals UE report desynchronization information to the connecting small cells S (step S143a). Alternatively, the user terminals UE report the desynchronization information to the small cells S via the macro cell M (step S143b).

Then, the small cells S having received the desynchronization information correct their synchronization based on this information (step S144). By executing above steps S141 and S144 in each small cell S, synchronization is established between the small cells S via the synchronization between the user terminals UE and the macro cell M, or via the absolute synchronization of the user terminals UE with a GPS clock.

Note that, in above steps S143a and S143b, the user terminals UE may report the desynchronization information to the synchronization management server. Then, the synchronization management server, having received the report, may be structured to determine the amount of correction of synchronization from the desynchronization information that is reported, and transmit the amount of correction of synchronization to each small cell S.

In this way, with the synchronization method for small cells according to the second example, user terminals UE assist the synchronization between the small cells S in an autonomous distributed manner, so that synchronization is established between the small cells S. By this means, it becomes possible to establish time synchronization and frequency synchronization between the small cells S, which is for realizing CoMP transmission between the small cells S with respect to user terminals UE.

Third Example

Figure 3C:
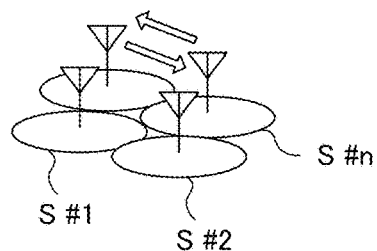
FIG. 3C provides diagrams to show radio communication systems according to the present embodiment.

In a third example, also referred to as "small cell cooperation," a group of small cells S (S #1 to S #n) are provided as shown in FIG. 3C, and the synchronization between the small cells S is established by transmitting and receiving radio signals between the small cells S.

Figure 9:
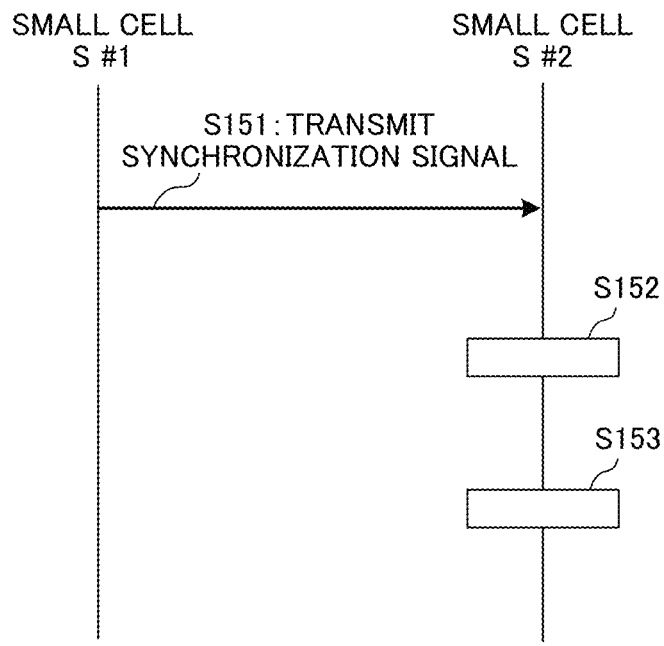
FIG. 9 is an example sequence diagram to show a radio communication method according to the present embodiment.

Now, with reference to FIG. 9, a case will be described below as an example of "small cell cooperation," where the synchronization between the small cells S is established by transmitting and receiving radio signals between the small cells S.

First, small cell S #1 transmits synchronization signals, which are radio signals, to neighboring small cell S #2 (step S151). As for the synchronization signals, the same synchronization signals as those used in the first example can be used.

Referring to step S151, from which small cells S, at what times and using which resources the synchronization signals are transmitted can be determined in each small cell S. Alternatively, the macro cell M or the synchronization management server may determine the small cells S to transmit the synchronization signals, and send notice to these small cell S.

Also, the synchronization signals may be transmitted on a regular basis. Alternatively, a small cell S may directly make a request to other small cells S so that the synchronization signals are transmitted from these other small cells S. In addition, a small cell S may make a request to the macro cell M or the synchronization management server so that the synchronization signals are transmitted from other small cells S.

Following this, the small cells S having received the synchronization signals measure the desynchronization with respect to nearby small cells S by using the synchronization signals (step S152).

Then, based on the desynchronization measured, the small cells S having received the synchronization signals correct their synchronization so that the desynchronizations measured between the small cells become smaller (step S153). The correction of synchronization may be conducted by estimating the average desynchronization by using, for example, the synchronization signals transmitted from a plurality of small cells S. Alternatively, it is equally possible to locate nearby small cells S of the transmission point and correct the synchronization based on the synchronization signals from these small cells S, or correct the synchronization by using only the synchronization signals transmitted from the macro cell M, other small cells S or small cells S (group) that are designated in advance.

Also, to reduce the likelihood that a plurality of small cells S correct their synchronization all at the same time, it is possible to carry out the correction of synchronization at random times or at times that are designated in advance on a per cell basis.

Furthermore, instead of determining the amount of correction of synchronization in small cells S that have received the synchronization signals, it is equally possible to employ a structure in which desynchronization information is reported to a representative small cell S, the macro cell M or the synchronization management server, the amount of correction of synchronization is determined where the desynchronization information is reported to, and then reported to each small cell S, and each small cell S corrects the synchronization based on the amount of correction of synchronization that is reported.

By repeating above steps S151 to S153 between small cells S, synchronization is established between the small cells S.

With the third example, a small cell S may operate as a user terminal UE (user terminal UE mode) and realize the UE-assisted autonomous example that has been described with the second example, without involving user terminals UE. Also, by operating as a user terminal UE (user terminal UE mode), a small cell S may perform a terminal discovery process (discovery process) by using the above-described discovery signals in terminal-to-terminal communication (D2D communication), and establish synchronization with other small cells S that operate as user terminals UE.

Also, with the third example, the synchronization signals may be transmitted not only to the small cells S, but may also be transmitted to the user terminals UE as well. By this means, it is possible to establish synchronization between the small cells S by combining the example of small cell cooperation, which has been described with the third example, and the UE-assisted autonomous example, which has been described with the second example.

In this way, with the synchronization method for small cells according to the third example, the synchronization between the small cells S is established by transmitting and receiving radio signals between the small cells S. By this means, it becomes possible to establish time synchronization and frequency synchronization between the small cells S, which is for realizing CoMP transmission between the small cells S with respect to user terminals UE.

The desynchronization information that is reported from the small cells S to the synchronization management server in the first example (step S113), or the desynchronization information that is reported from the user terminals UE to the macro cell M and the small cells S in the second example (step S123a and 123b or steps S143a and 143b) is one of the information (a) to (h) shown below, or may be formed by combining the following information (a) to (h) in an arbitrary manner.

(a) Identification information (ID) of the user terminals UE that estimate the desynchronization or the target small cells S may be used.

(b) Information as to whether or not the user terminals UE that estimate the desynchronization or the target small cells S are in absolute synchronization such as GPS synchronization may be used.

(c) Identification information (ID) of the user terminals UE or the small cells S being the source from which the synchronization signals used in the estimation of desynchronization are transmitted may be used.

(d) Information as to whether the user terminals UE or the small cells S being the source from which the synchronization signals used in the estimation of desynchronization are transmitted are in absolute synchronization such as GPS synchronization may be used.

(e) Information about the radio quality of the synchronization signal such as the RSRQ and the SINR may be used.

(f) As desynchronization estimation results, identification information to represent an absolute clock and a reference clock may be used. For example, it is possible to use indicators that can identify whether or not GPS is used, identify the macro cell M, identify the cell IDs of the small cells S having a reference clock, or identify arbitrary combinations of these.

(g) As desynchronization estimation results, information about an absolute clock such as a GPS clock may be used.

(h) As desynchronization estimation results, information about the desynchronization with respect to a reference clock may be used. Note that the reference clock here refers to, for example, the clock of one of a GPS, the macro cell M, a specific small cell S, and the recipient of synchronization information. Furthermore, the desynchronization here includes one or both of desynchronization in time and desynchronization in frequency.

Also, in order to reduce the amount of signaling when reporting the above desynchronization information and achieve improved reliability, the small cells S or the user terminals UE can execute one of the controls (a) to (g) shown below, or execute control combining (a) to (g) in an arbitrary manner.

(a) Control to reduce the number of reporting bits when reporting desynchronization information may be executed. For example, if rough synchronization is the premise (macro synchronization or rough synchronization between small cells), it is possible to reduce the number of bits to use for the reporting. Note that rough synchronization refers to synchronization at several hundreds of Hz in frequency, and refers to synchronization on the subframe or the frame level in time.

(b) Control to reduce the frequency of reporting desynchronization information may be executed. For example, a small cell S, once synchronized, is unlikely to go completely out of synchronization in short time, so that it is possible to reduce the frequency of reporting by using the magnitude of the desynchronization that is detected.

(c) Control to designate the user terminals UE or the small cells S to report desynchronization information in advance may be executed.

(d) Control to designate the user terminals UE or the small cells S to report desynchronization information from the macro cell M or a small cell S may be executed.

(e) Control to designate the user terminals UE or the small cells S to report desynchronization information from a small cell S or a user terminal UE that is near the user terminals UE or the small cells S to which the desynchronization information is reported may be executed. Note that whether or not a user terminal UE or a small cell S is near the user terminals UE or the small cells S to which the desynchronization information is reported can be judged based on radio quality or the time of reception.

(f) Control to designate the user terminals UE or the small cells S to report desynchronization information from a user terminal UE or a small cell S of high radio quality may be executed.

(g) Control to designate the user terminals UE or the small cells S to report desynchronization information from a user terminal UE or a small cell S where the desynchronization is equal to or less than a predetermined range may be executed.

According to the first example to the third example, the synchronization management server, to which desynchronization information is reported, determines the amount of correction of synchronization based on that desynchronization information. When this takes place, in order to improve the reliability of, and for the simplification of, synchronization, the synchronization management server can execute one of the controls (a) to (c) shown below, or execute control to combine (a) to (c) in an arbitrary manner.

(a) When a plurality of reports are received in a certain period of time with respect to the same small cell S, it is possible to determine the amount of correction of synchronization by selecting one of a report to indicate high radio quality, a report to indicate little desynchronization, the average value of the reported values, and a report to indicate that absolute synchronization (such as GPS synchronization) is established, or by selecting an arbitrary combination of these.

(b) By finding the average desynchronization over a certain period time, it is possible to determine the amount of correction of synchronization.

(c) By collecting desynchronization information in a representative small cell S, the macro cell M, or the synchronization management server, it is possible to determine the amount of correction of synchronization for each small cell S.

According to the first example to the third example, each small cell S can estimate the reliability of the synchronization that is established between the small cells S as a result of synchronization. By this means, even when synchronization is not established in all the small cells S with required reliability, it is still possible to carry out CoMP only between the small cells S where the reliability of synchronization meets is equal to or higher than a certain level.

The reliability of synchronization between small cells S may be estimated by using one of the methods (a) to (f) shown below, or by combining the methods (a) to (f) in an arbitrary manner.

(a) The method of estimating the reliability of synchronization from the reliability of synchronization that can be achieved at a minimum by the synchronization method used, may be used.

(b) The method of estimating the reliability of synchronization from the number of user terminals UE or small cells S that report synchronization information in a certain period of time may be used when synchronization is established by using radio signals.

(c) The method of estimating the reliability of synchronization from the frequency of correcting synchronization (for example, the time that has passed since last synchronization) may be used when synchronization is established by using radio signals.

(d) The method of estimating the reliability of synchronization from the variation of synchronization correction values over time (for example, the distribution over time) may be used when synchronization is established by using radio signals.

(e) The method of estimating the reliability of synchronization from the magnitude of the synchronization correction value may be used when synchronization is established by using radio signals.

(f) The method of estimating the reliability of synchronization from the radio quality of the synchronization signals may be used when synchronization is established by using radio signals.

(Radio Communication System)

Figure 10:
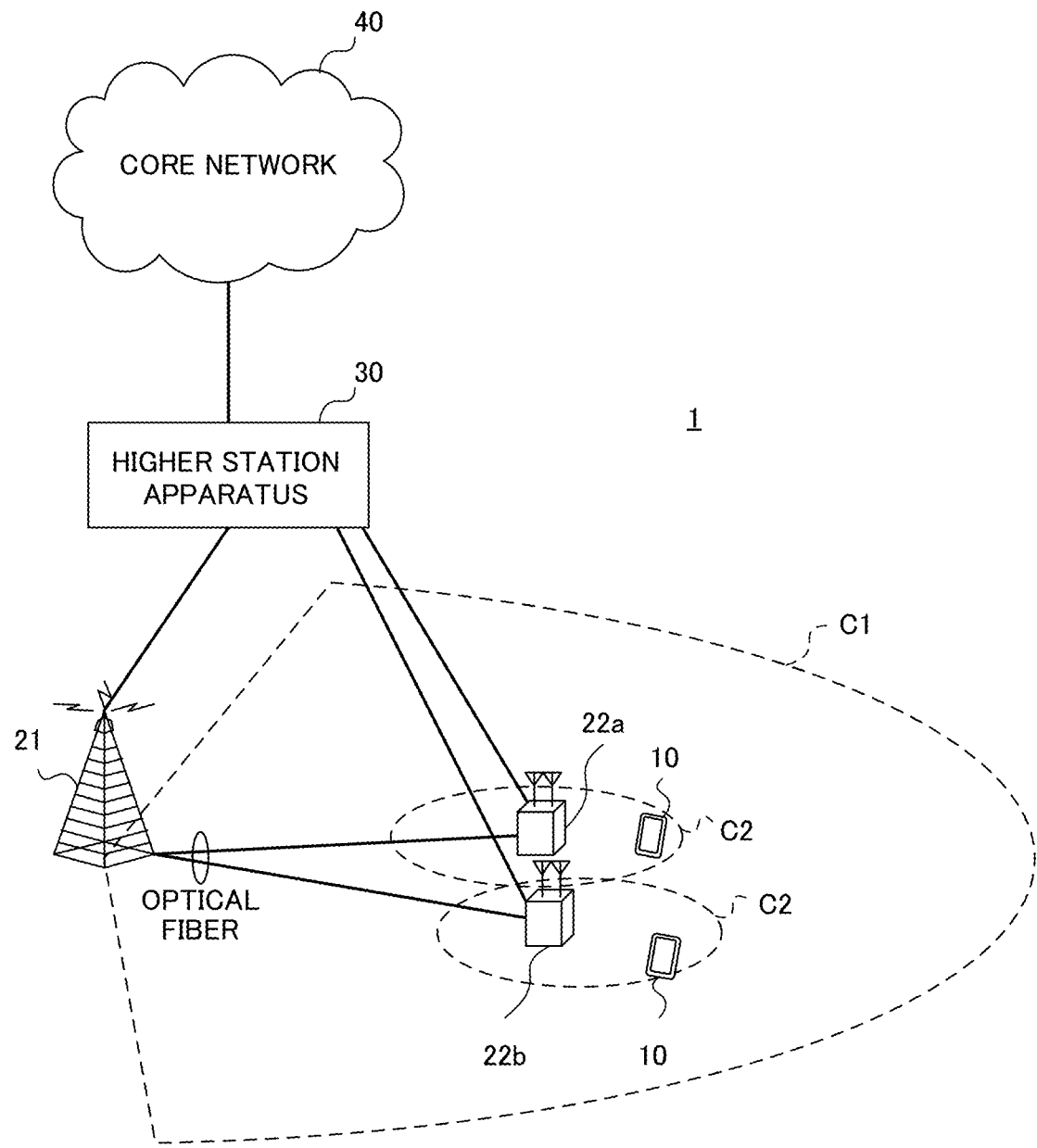
FIG. 10 is a diagram to explain a system structure of a radio communication system.

Now, the radio communication system according to the present embodiment will be described in detail below. FIG. 10 is a diagram to show a schematic configuration of the radio communication system according to the present embodiment. Note that the radio communication system shown in FIG. 10 is a system to accommodate, for example, an LTE system or SUPER 3G. This radio communication system adopts carrier aggregation to group a plurality of fundamental frequency blocks (component carriers) into one, where the system band of the LTE system constitutes one unit. Also, this radio communication system may be referred to as "IMT-advanced," or may be referred to as "4G" or "FRA (Future Radio Access)."

The radio communication system 1 illustrated in FIG. 10 includes a radio base station 21 that forms a macro cell C1 as a first cell, and radio base stations 22a and 22b that form small cells C2 as second cells, which are placed inside the macro cell C1 and which are narrower than the macro cell C1. Also, in the macro cell C1 and in each small cell C2, user terminals 10 are placed. The user terminals 10 are structured to be able to perform radio communication with both the radio base station 21 and the radio base stations 22.

Communication between the user terminals 10 and the radio base station 21 is carried out using a carrier of a relatively low frequency band (for example, 2 GHz) and a wide bandwidth (referred to as a "legacy carrier" and so on). Meanwhile, between the user terminals 10 and the radio base stations 22, a carrier of a relatively high frequency band (for example, 3.5 GHz) and a narrow bandwidth may be used, or the same carrier as that used in the radio base station 21 may be used. The radio base station 21 and each radio base station 22 are connected by wire connection or by wireless connection.

The radio base station 21 and the radio base stations 22 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 22 may be connected with the higher station apparatus via the radio base station 21.

Note that the radio base station 21 is a radio base station having a relatively wide coverage, and may be referred to as an "eNodeB," a "radio base station," a "transmission point" and so on. Also, the radio base stations 22 are radio base stations having local coverages, and may be referred to as "pico base stations," "femto base stations," "Home eNodeBs," "RRHs (Remote Radio Heads)," "micro base stations," "transmission points" and so on. The radio base stations 21 and 22 will be hereinafter collectively referred to as "radio base station 20," unless distinction needs to be drawn otherwise. The user terminals 10 are terminals to support various communication schemes such as LTE and LTE-A (for example, UEs of Rel. 11 and earlier versions and UEs of Rel. 12 and later versions), and may include mobile communication terminals as well as fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Now, communication channels to be used in the radio communication system shown in FIG. 10 will be described. Downlink communication channels include a PDSCH (Physical Downlink Shared Channel), which is used by each user terminal 10 on a shared basis, and downlink L1/L2 control channels (a PDCCH, a PCFICH, a PHICH and an EPDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACKs and NACKs for the PUSCH are transmitted by the PHICH (Physical Hybrid-ARQ Indicator CHannel). Also, scheduling information for the PDSCH and the PUSCH and so on may be transmitted by the EPDCCH (Enhanced PDCCH) as well. This EPDCCH can be arranged to be frequency-division-multiplexed with the PDSCH.

Uplink communication channels include a PUSCH (Physical Uplink Shared CHannel), which is used by each user terminal 10 on a shared basis as an uplink data channel, and a PUCCH (Physical Uplink Control CHannel), which is an uplink control channel. User data and higher control information are transmitted by this PUSCH. Also, downlink radio quality information (CQI: Channel Quality Indicator), ACKs/NACKs and so on are transmitted by the PUCCH.

Next, with reference to FIG. 11, an overall structure of a radio base station 20 (which may be all of 21, 22a and 22b) according to the present embodiment will be described.

The radio base station 20 has transmitting/receiving antennas 201, amplifying sections 202, transmitting/receiving sections (transmitting section/receiving section) 203, a baseband signal processing section 204 (214), a call processing section 205 and a transmission path interface 206. Transmission data to be transmitted from the radio base station 20 to user terminals 10 on the downlink is input from the higher station apparatus 30 to the baseband signal processing section 204 (214), via the transmission path interface 206.

In the baseband signal processing section 204 (214), a downlink data channel signal is subjected to a PDCP layer process, division and coupling of transmission data, an RLC (Radio Link Control) layer transmission process such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process. Furthermore, the signal of a physical downlink control channel, which is a downlink control channel, is also subjected to transmission processes such as channel coding and an inverse fast Fourier transform.

Also, the baseband signal processing section 204 (214) reports control information for allowing each user terminal 10 to perform radio communication with the radio base station 20, to the user terminals 10 connected to the same cell, by a broadcast channel. The information for allowing communication in the cell includes, for example, the uplink or downlink system bandwidth, root sequence identification information (root sequence indices) for generating random access preamble signals in the PRACH and so on.

The transmitting/receiving sections 203 convert baseband signals output from the baseband signal processing section 204 (214) into a radio frequency band. The amplifying sections 202 amplify the radio frequency signals having been subjected to frequency conversion, and transmit the results through the transmitting/receiving antennas 201. Note that the transmitting/receiving sections 203 function as a receiving section that receives synchronization correction information, which is for establishing synchronization between the targets of synchronization, from each user terminal 10, and function as a transmitting section that transmits the synchronization signals to each user terminal 10.

On the other hand, as for signals to be transmitted from the user terminals 10 to the radio base station 20 on the uplink, radio frequency signals that are received in the transmitting/receiving antennas 201 are each amplified in the amplifying sections 202, converted into baseband signals through frequency conversion in the transmitting/receiving sections 203, and input in the baseband signal processing section 204 (214).

In the baseband signal processing section 204 (214), the transmission data that is included in the baseband signals received on the uplink is subjected to an FFT (Fast Fourier Transform) process, an IDFT (Inverse Discrete Fourier Transform) process, error correction decoding, a MAC retransmission control receiving process, and RLC layer and PDCP layer receiving processes. The decoded signals are transferred to the higher station apparatus 30 via the transmission path interface 206.

The call processing section 205 performs call processing such as setting up and releasing communication channels, manages the state of the radio base station 20 and manages the radio resources.

Figure 11:
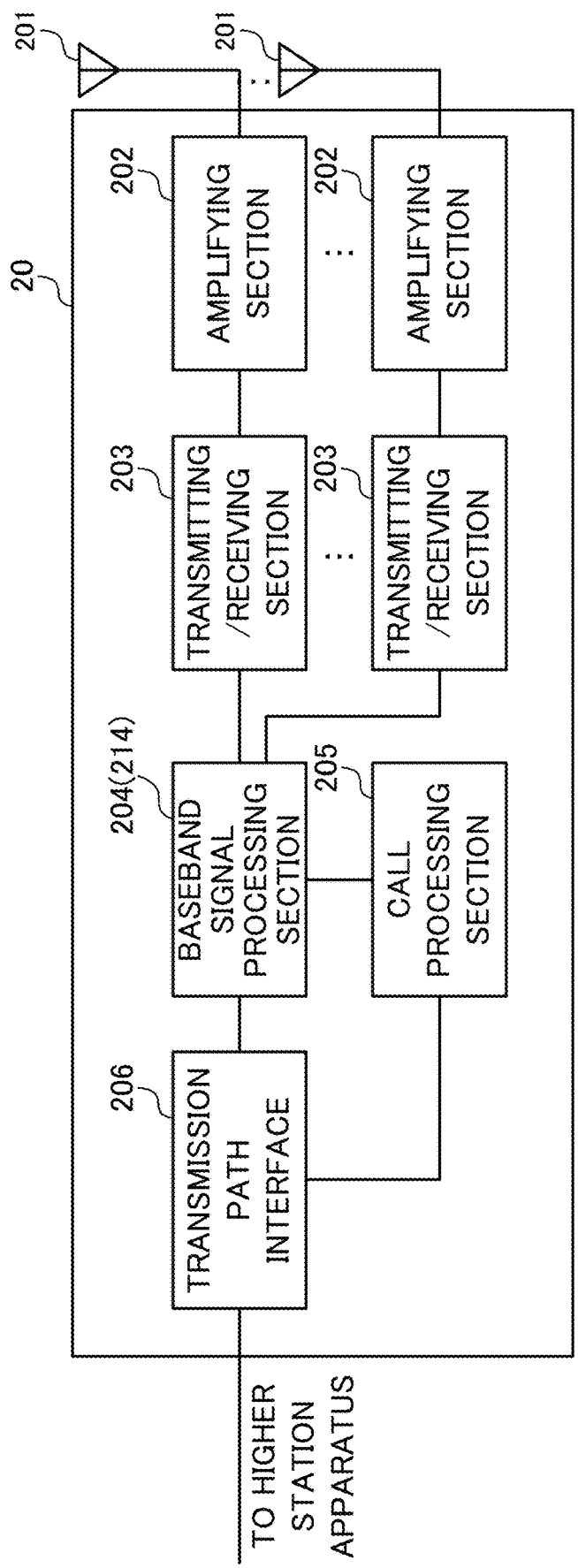
FIG. 11 is a diagram to explain an overall structure of a radio base station.
Figure 12:
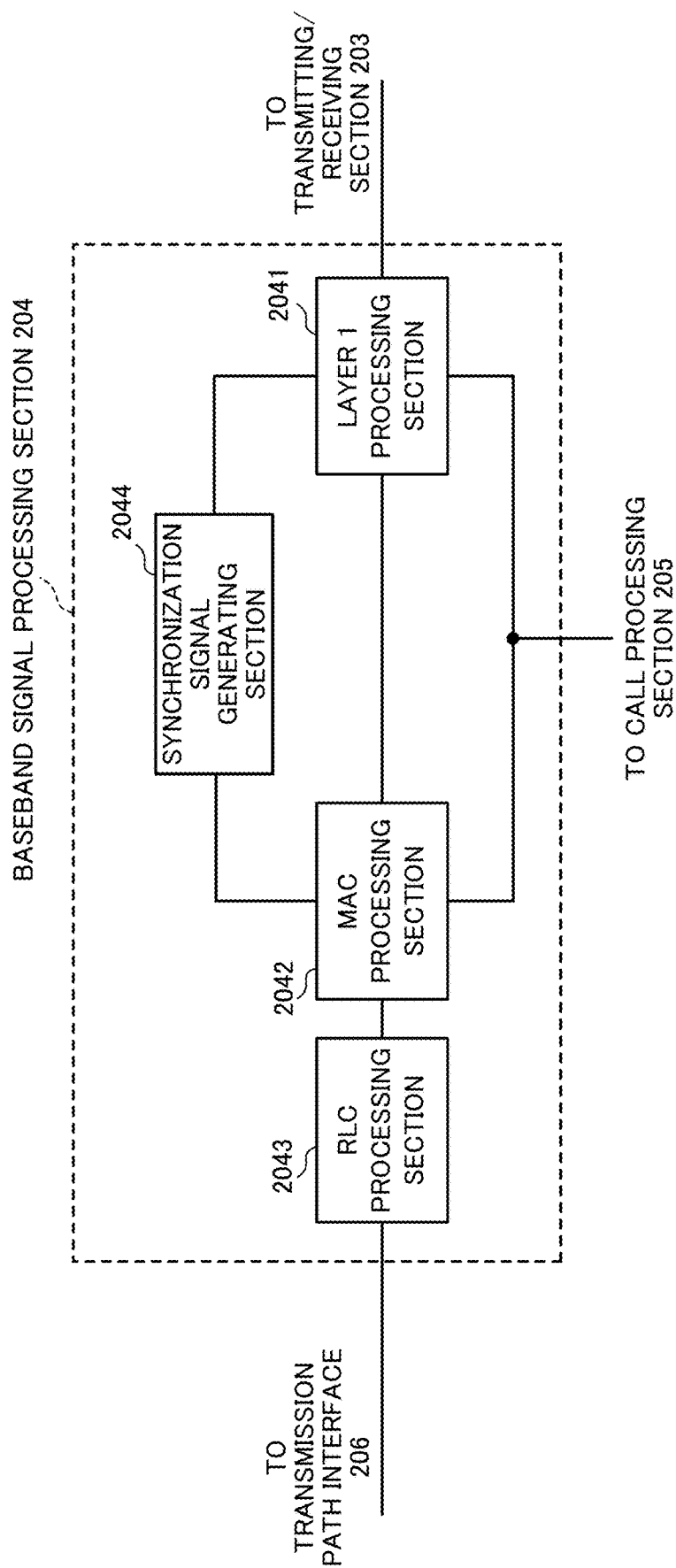
FIG. 12 is a functional block diagram that corresponds to a baseband processing section in a radio base station.

FIG. 12 is a block diagram to show the structure of the baseband signal processing section provided in the radio base station 21 shown in FIG. 11. The baseband signal processing section 204 is primarily formed with a layer 1 processing section 2041, a MAC processing section 2042, an RLC processing section 2043 and a synchronization signal generating section 2044.

The layer 1 processing section 2041 primarily performs processes pertaining to the physical layer. For example, the layer 1 processing section 2041 applies processes to signals that are received on the uplink, including channel decoding, a discrete Fourier transform (DFT), frequency demapping, an inverse fast Fourier transform (IFFT), data demodulation and so on. Also, the layer 1 processing section 2041 applies processes to signals to transmit on the downlink, including channel coding, data modulation, frequency mapping and an inverse fast Fourier transform (IFFT).

The MAC processing section 2042 performs processes for the signals that are received on the uplink, including MAC layer retransmission control, scheduling of the uplink/downlink, transport format selection for the PUSCH/PDSCH, resource block selection for the PUSCH/PDSCH, and so on. The RLC processing section 2043 performs, for packets that are received on the uplink/packets to transmit on the downlink, division of the packets, coupling of the packets, RLC layer retransmission control and so on.

The synchronization signal generating section 2044 generates the synchronization signals shown earlier with the first example. That is, the synchronization signal generating section 2044 generates synchronization signals that serve as a basis when the small cells synchronize.

Figure 13:
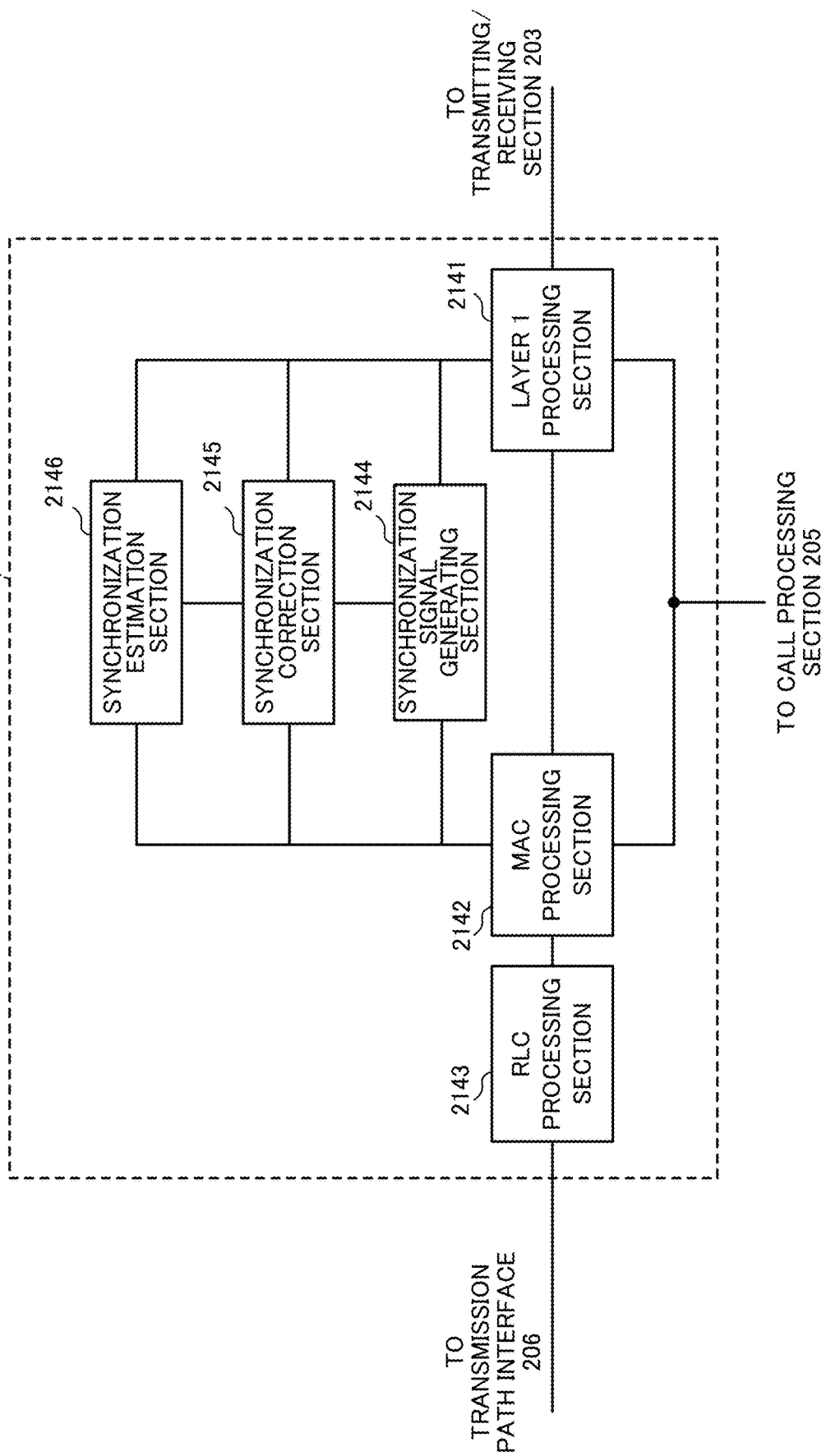
FIG. 13 is a functional block diagram that corresponds to a baseband processing section in a radio base station.

FIG. 13 is a block diagram to show the structure of the baseband signal processing section in the radio base stations 22*a* and 22*b* shown in FIG. 11. The baseband signal processing section 214 is primarily formed with a layer 1 processing section 2141, a MAC processing section 2142, an RLC processing section 2143, a synchronization signal generating section 2144, a synchronization correction section 2145 and a synchronization estimation section 2146.

The layer 1 processing section 2141, the MAC processing section 2142 and the RLC processing section 2143 perform the same processes as those by the layer 1 processing section 2041, the MAC processing section 2042 and the RLC processing section 2043 shown in FIG. 12.

The synchronization signal generating section 2144 generates the synchronization signals shown earlier with the second example and the third example. That is, the synchronization signal generating section 2144 generates synchronization signals that are used to estimate information about desynchronization as information for the correction of synchronization in the user terminals. The synchronization correction section 2145 corrects the synchronization based on the synchronization correction information that is received. The synchronization estimation section 2146 estimates information about the desynchronization with respect to the synchronization target (for example, the macro cell, GPS clock and so on) in accordance with the synchronization correction information.

Next, an overall structure of a user terminal according to the present embodiment will be described with reference to FIG. 11. An LTE terminal and an LTE-A terminal have the same hardware structures in principle parts, and therefore will be described without drawing distinction between them. A user terminal 10 has transmitting/receiving antennas 101, amplifying sections 102, transmitting/receiving sections (transmitting section/receiving section) 103, a baseband signal processing section 104 and an application section 105.

As for downlink data, radio frequency signals that are received in the transmitting/receiving antennas 101 are amplified in the amplifying sections 102, and converted into baseband signals through frequency conversion in the transmitting/receiving sections 103. These baseband signals are subjected to an FFT process, error correction decoding, a retransmission control receiving process and so on, in the baseband signal processing section 104. In this downlink data, downlink transmission data is transferred to the application section 105. The application section 105 performs processes related to higher layers above the physical layer and the MAC layer, and so on. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process and an IFFT process. The baseband signals that are output from the baseband signal processing section 104 are converted into a radio frequency band in the transmitting/receiving sections 103. After that, the amplifying sections 102 amplify the radio frequency signals having been subjected to frequency conversion, and transmit the results from the transmitting/receiving antennas 101.

Note that the transmitting/receiving sections 103 function as a receiving section to receive the synchronization signals.

Figure 14:
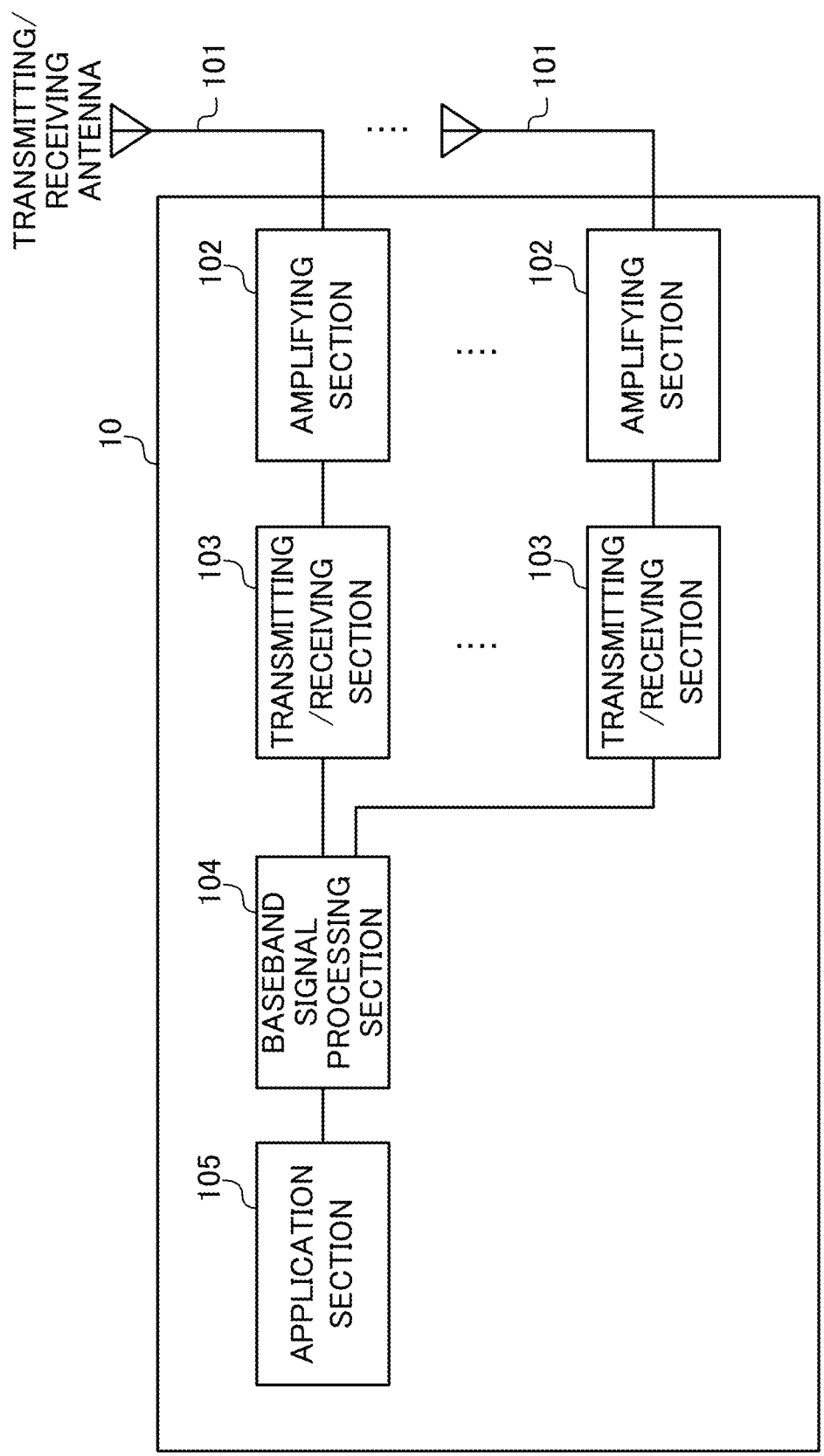
FIG. 14 is a diagram to explain an overall structure of a user terminal.
Figure 15:
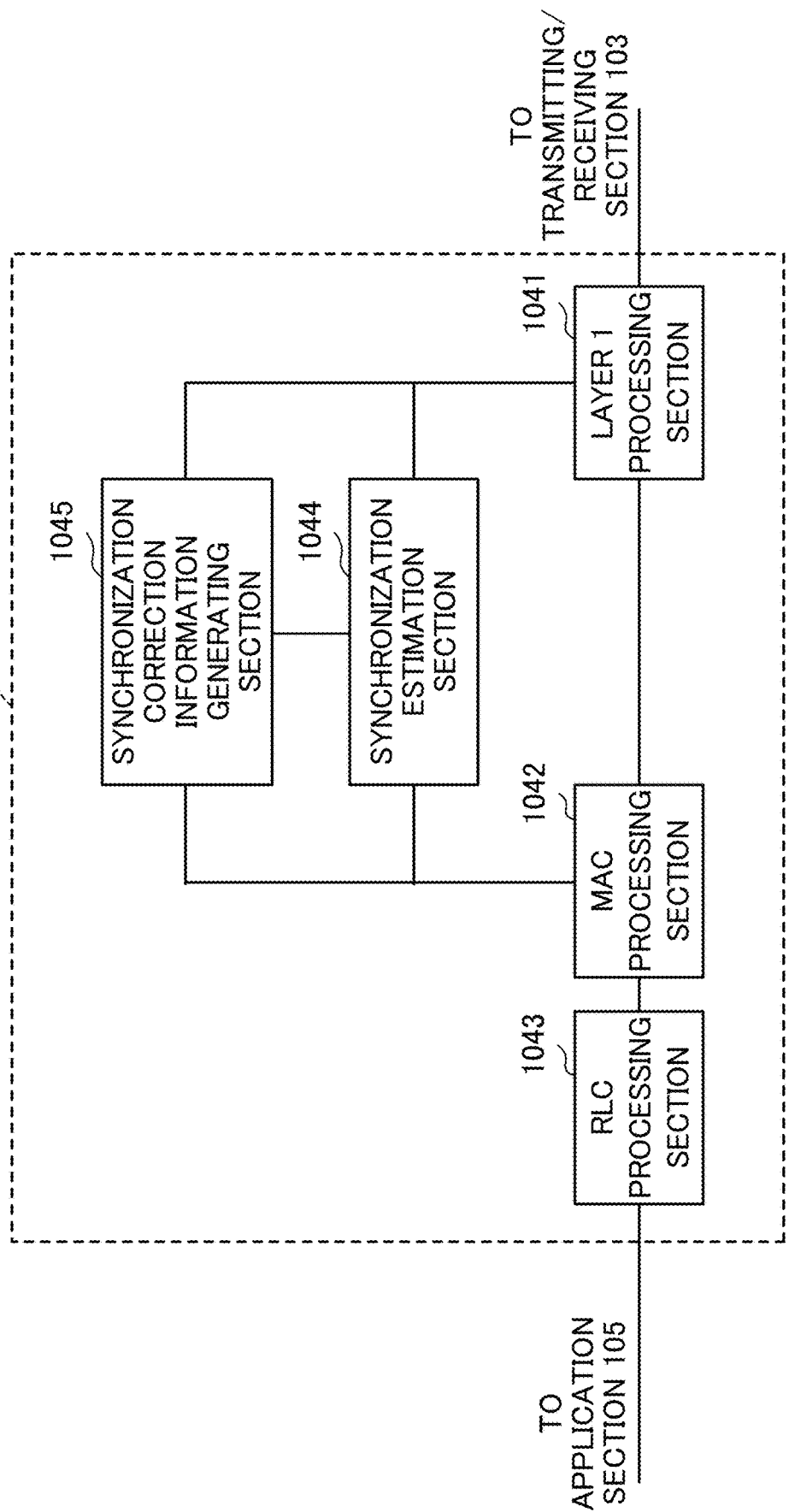
FIG. 15 is a functional block diagram that corresponds to a baseband processing section in a user terminal.

FIG. 15 is a block diagram to show a structure of the baseband signal processing section in the user terminal shown in FIG. 14. The baseband signal processing section 104 is primarily formed with a layer 1 processing section 1041, a MAC processing section 1042, an RLC processing section 1043, a synchronization estimation section 1044 and a synchronization correction information generating section 1045.

The layer 1 processing section 1081 mainly performs processes related to the physical layer. The layer 1 processing section 1081, for example, applies processes such as channel decoding, a discrete Fourier transform (DFT), frequency demapping, an inverse Fourier transform (IFFT) and data demodulation, to a signal received on the downlink. Also, the layer 1 processing section 1081 performs processes for a signal to transmit on the uplink, including channel coding, data modulation, frequency mapping and an inverse fast Fourier transform (IFFT).

The MAC processing section 1042 performs, for the signal received on the downlink, MAC layer retransmission control (hybrid ARQ), an analysis of downlink scheduling information (specifying the PDSCH transport format and specifying the PDSCH resource blocks) and so on. Also, the MAC processing section 1082 performs, for the signal to transmit on the uplink, MAC retransmission control, an analysis of uplink scheduling information (specifying the PUSCH transport format and specifying the PUSCH resource blocks) and so on.

The RLC processing section 1043 performs, for the packets received on the downlink/the packets to transmit on the uplink, division of the packets, coupling of the packets, RLC layer retransmission control and so on.

The synchronization estimation section 1044 estimates the desynchronization between the small cells and the synchronization target based on the synchronization signals that are received. The synchronization correction information generating section 1045 generates synchronization correction information. The synchronization correction information is formed by including, for example, the desynchronization information estimated in the synchronization estimation section 1044, the RACH signals shown earlier with the second example, and so on.

Note that the radio base stations 21, 22*a* and 22*b* may have the functions of a synchronization management server. That is, the radio base stations 21, 22*a* and 22*b* may have synchronization information management functions for collecting desynchronization information and reporting the amount of correction of synchronization.

Note that the present invention is by no means limited to the above embodiment and can be carried out with various changes. With the above embodiment, the size, shape and so on shown in the accompanying drawings are by no means limiting, and can be changed as appropriate within the range in which the effect of the present invention is kept optimal. Besides, the present invention can employ various changes and be implemented without departing the scope of the object of the present invention.

The invention claimed is:

1. A user terminal in a radio communication system configured with a cell group including a plurality of cells, the user terminal comprising:
   a receiver that receives target cell information to measure a timing difference from a radio base station of a cell; and
   a processor that measures, based on the target cell information, a timing difference between cells,
   wherein the user terminal determines a parameter,
   wherein, when the parameter is a first value, the user terminal reports the timing difference to the radio base station, and
   wherein, when the parameter is a second value, the user terminal does not report the timing difference to the radio base station.

2. The user terminal according to claim 1, wherein the processor measures the timing difference between the cells by using a synchronization signal transmitted from the radio base station.

3. A radio base station in a radio communication system configured with a cell group including a plurality of cells, the radio base station comprising:
   a transmitter that transmits target cell information to measure a timing difference to a user terminal; and
   a receiver that, when a parameter determined by the user terminal is a first value, receives information of the timing difference measured in the user terminal.

4. The radio base station according to claim 3, wherein the timing difference is corrected based on the information of the timing difference.

5. A radio communication system configured with a cell group including a plurality of cells, the radio communication system comprising:
   a user terminal having:
      a first receiver that receives target cell information to measure a timing difference from a radio base station of a cell; and
      a processor that measures, based on the target cell information, a timing difference between cells,
      wherein the user terminal determines a parameter,
      wherein, when the parameter is a first value, the user terminal reports the timing difference to the radio base station, and
      wherein, when the parameter is a second value, the user terminal does not report the timing difference to the radio base station;
   and
   the radio base station having:
      a transmitter that transmits the target cell information; and
      a second receiver that, when the parameter determined by the user terminal is the first value, receives the information of the timing difference measured in the user terminal.

6. The radio communication system according to claim 5, wherein the first processor measures the timing difference between the cells by using a synchronization signal transmitted from the radio base station.

7. The radio communication system according to claim 5, wherein the timing difference is corrected based on the information of the timing difference.

8. The radio communication system according to claim 6, wherein the timing difference is corrected based on the information of the timing difference.

* * * * *